(12) United States Patent
Frigon et al.

(10) Patent No.: US 9,246,238 B2
(45) Date of Patent: Jan. 26, 2016

(54) SYSTEM FOR CONTROLLING A RADIATION PATTERN OF A DIRECTIONAL ANTENNA

(75) Inventors: Jean-François Frigon, Brossard (CA); Christophe Caloz, Montreal (CA); Samer Abielmona, Ottawa (CA); Van-Hoang Nguyen, Montreal (CA)

(73) Assignee: Polyvalor, Limited Partnership, Montreal (CA)

( * ) Notice: Subject to any disclaimer, the term of this patent is extended or adjusted under 35 U.S.C. 154(b) by 433 days.

(21) Appl. No.: 13/201,984

(22) PCT Filed: Feb. 19, 2010

(86) PCT No.: PCT/CA2010/000236
§ 371 (c)(1),
(2), (4) Date: Oct. 25, 2011

(87) PCT Pub. No.: WO2010/094132
PCT Pub. Date: Aug. 26, 2010

(65) Prior Publication Data
US 2012/0044108 A1  Feb. 23, 2012

Related U.S. Application Data

(60) Provisional application No. 61/153,813, filed on Feb. 19, 2009.

(51) Int. Cl.
*H01Q 25/00* (2006.01)
*H04B 7/08* (2006.01)

(52) U.S. Cl.
CPC .............. *H01Q 25/00* (2013.01); *H04B 7/086* (2013.01)

(58) Field of Classification Search
CPC ................................. H01Q 25/00; H04B 7/086
USPC ............................................ 342/360, 357.71
See application file for complete search history.

(56) References Cited

U.S. PATENT DOCUMENTS

2005/0075140 A1*  4/2005  Famolari ................. 455/562.1
2006/0208947 A1    9/2006  Masataka et al.
(Continued)

FOREIGN PATENT DOCUMENTS

| EP | 0869577 A1 | 10/1998 |
| EP | 1026835 A2 | 8/2000 |
| EP | 1361679 A2 | 11/2003 |

OTHER PUBLICATIONS

Frigon et al., Dynamic Radiation Pattern Diversity (DRPD) MIMO Using CRLH Leaky-wave Antenna, Radio & Wireless Symposium 2008 IEEE, pp. 635-638.
(Continued)

*Primary Examiner* — Harry Liu

(57) ABSTRACT

The present system relates to radiation pattern control. More particularly, the present system is adapted for controlling a radiation pattern of a directional antenna. The system comprises a sample collection unit, a power angular spectrum estimation unit and a control unit. The sample collection unit is adapted for collecting a plurality of samples of a signal with a current radiation pattern and a plurality of samples of the signal with different radiation patterns. The power angular spectrum estimation unit is adapted for estimating a preliminary spectrum of the signal based on the collected plurality of samples with the current radiation pattern and for estimating an optimized spectrum of the signal based on the collected plurality of samples with different radiation patterns. Then, the control unit sets the radiation pattern of the directional antenna to the estimated optimized spectrum.

12 Claims, 4 Drawing Sheets

(56) References Cited

U.S. PATENT DOCUMENTS

2007/0142004 A1    6/2007  Yokoi et al.
2007/0230639 A1*  10/2007  Stirling-Gallacher ........ 375/347
2009/0140920 A1    6/2009  Frigon et al.
2011/0090981 A1*   4/2011  Lindgren et al. .............. 375/267

OTHER PUBLICATIONS

Lim et al., Metamaterial-based Electronically Controlled Transmission-Line Structure as a Novel Leaky-Wave Antenna with Tunable Radiation Angle and Beamwidth, Microwave Theory and Techniques, IEEE Transactions; vol. 52, Issues 12; Dec. 2004, pp. 2678-2690.

* cited by examiner

SYSTEM FOR CONTROLLING A RADIATION PATTERN OF A DIRECTIONAL ANTENNA

FIELD

The present system relates to the field of telecommunication and more particularly to controlling a radiation pattern of a directional antenna.

BACKGROUND

Next-generation WiFi standard (802.11 n) promises up to 600 Megabits per second (Mbps) in wireless transmission data rate. Such a wireless transmission data rate is very interesting, as it renders possible "true" wireless applications. At this data rate, triple-play services (data, voice, and video) can be supported in an enterprise or a home environment. The standard calls for MIMO (Multiple-Input-Multiple-Output) implementation, which entails having more than one antenna at the access points. By transmitting data on two or more different antennas, the data rate can be increased without having to increase transmission power and/or bandwidth.

Most current 802.11 n systems utilize antennas that are omni directional, i.e. where the signal is transmitted in all directions. Use of omni directional antennas presents mainly two disadvantages: short transmission distance and interference. Both of these problems contribute to lower the data rate while also rendering the wireless connection unreliable. These problems were not addressed in previous versions of the WiFi standard (802.11 a/b/g). However, with the promise of WiFi replacing Gigabit-Ethernet, these problems have to be addressed to make next-generation WiFi deliver on its promise of 600 Mbps wireless transmission data rate.

In U.S. patent application Ser. No. 11/947,759 "Dynamic radiation pattern antenna system", Frigon et al. propose to utilize a directional antenna that focuses the signal towards a mobile terminal as a receiver, alleviating the problems of short transmit distance and interference simultaneously. The directional antenna is coupled with a "smart" algorithm called DRPD (Dynamic Radiation Pattern Diversity) which is able to intelligently steer the beam in a particular direction in order to provide the mobile terminal with a reliable connection. As well, the DRPD entails converging towards a more "dynamic" approach to antennas rather than the current "static" approach typically found in most commercial products. Coupled with MIMO, DRPD provides the mobile terminal with the highest possible data rate in any given environment (office or home).

For doing so, Frigon et al. use a novel and breakthrough leaky-wave antenna (LWA) which is a first of its kind. This antenna is shown in FIG. 1. It is based on metamaterial composite right/left-handed (CRLH) technology developed by Dr. Christophe Caloz. The backfire-to-endfire CRLH LWA provides for the first time the capability of scanning the entire free space with high directivity and flexibility, without requiring any cumbersome and power-hungry (lossy) feeding network compared with conventional antenna arrays. This LWA is fundamentally a traveling wave (as opposed to resonant) antenna, where backward/broadside/forward radiation is obtained when the structure is tuned to propagate a backward/ "standing"/forward wave. FIG. 1(a) illustrates the CRLH LWA, while FIG. 1(b) depicts a varactor-based CRLH LWA.

By incorporating varactor diodes (i.e. capacitors with a capacitance varying as a function of their reverse-bias voltage) in the structure, the beam can be scanned in real-time. It is then possible, by electronically tuning the varactor diodes' reverse-bias voltages, to achieve full-space scanning at a fixed operation frequency. Typical simulated and measured radiation patterns of a CRLH LW antenna are shown in FIG. 2. By electronically changing the bias-voltages of the CRLH LW antenna, a wide and continuous range of radiation patterns for a single antenna element can be efficiently achieved.

Power angular spectrum (PAS) parameters are used to define an antenna's radiation pattern. PAS parameters comprise angle of arrival, angular spread and power gain. The PAS parameters are dominated by large scale effects and vary in an order of several tens of seconds. It is thus possible to adapt the radiation patterns to long term statistics of these parameters instead of their instantaneous values. Using simulations, it has been shown that such approach results in penalties in the order of 1.5 dB when such a long term approach is used. This long term approach proves interesting only if PAS parameters can be accurately estimated.

However, with current systems and methods, it is not possible to set an antenna's optimal radiation pattern of a DRPD without sufficient information on the required radiation pattern. There is thus a need for a radiation pattern control system for accurately acquiring information about a signal and setting a corresponding radiation pattern.

BRIEF DESCRIPTION OF THE FIGURES

In the present description, similar references denote like parts.

DESCRIPTION

The present system relates to radiation pattern control. More particularly, the present system is adapted for controlling a radiation pattern of a directional antenna. For doing so, the system comprises a sample collection unit, a power angular spectrum estimation unit and a control unit. The sample collection unit is adapted for collecting a plurality of samples of a signal with a current radiation pattern and a plurality of samples of the signal with different radiation patterns. The power angular spectrum estimation unit is adapted for estimating a preliminary spectrum of the signal based on the collected plurality of samples with the current radiation pattern and for estimating an optimized spectrum of the signal based on the collected plurality of samples with different radiation patterns. The control unit is adapted for setting the radiation pattern of the directional antenna based on the estimated optimized spectrum. The plurality of samples with the current radiation pattern are obtained in one aspect by means of a plurality of additional directional antennas, while in another aspect the plurality of samples with the current radiation pattern are obtained by means of a plurality of omni directional antennas. The present system is applicable to any type of transceiver, such as for example an access point or a terminal. The present system can be applied to long term adaptation, i.e. controlling radiation pattern upon receipt of a new signal or signal deterioration, or short term adaptation, i.e. on a per packet basis.

To facilitate reading of the present description, the following acronyms are used:
ACK: Acknowledgement
AGC: Automatic Gain Control
AP: Access Point
CRLH LWA: Composite Right/Left-Handed Leaky Wave Antenna
DRPD: Dynamic Radiation Pattern Diversity system as described in U.S. patent application Ser. No. 11/947,759
GI: Guard Interval
LTF: Long Training Field
MAC: Medium Access Control Layer
OFDM: Orthogonal Frequency Division Modulation
PAS: Power Angular Spectrum
PHY: Physical Layer
RF: radio frequency
ScisWave antenna: a directional CRLH LWA with a co-located omni directional antenna (shown on FIG. 4)
SIFS: Short Interframe Space
SNR: Signal to Noise Ratio
STF: Short Training Field.

Figure 1:
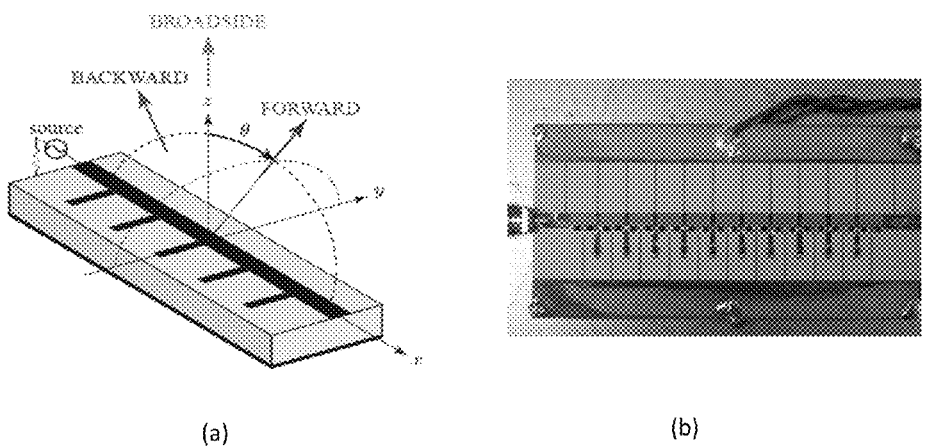
FIG. 1 is a schematic representation of a prior art leaky-wave antenna.
Figure 2:
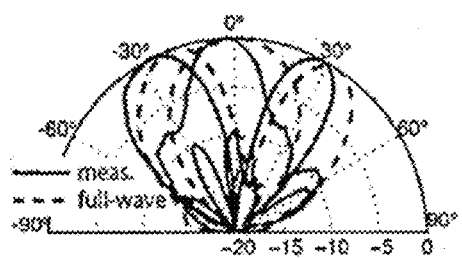
FIG. 2 is a graph of typical radiation patterns for a varactor-based CRLH LWA.
Figure 3:
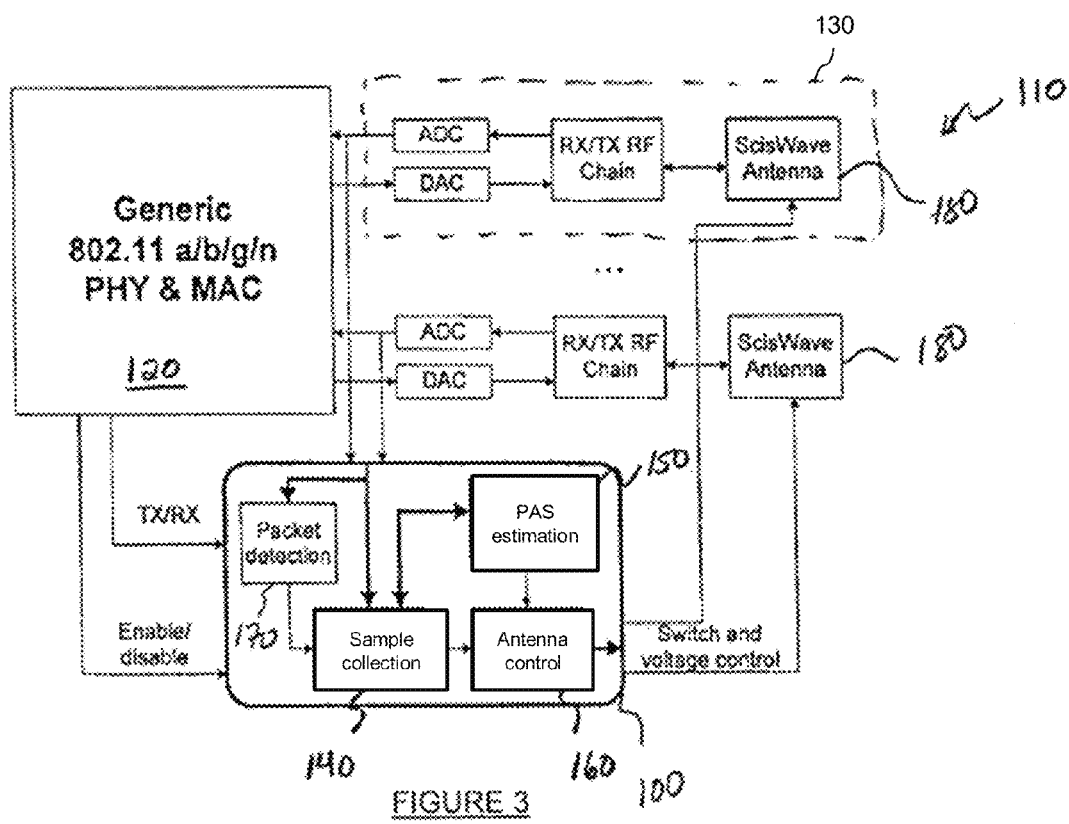
FIG. 3 is a block diagram representation of integration the present system with a generic 802.11 chipset.

Reference is now made to FIG. 3 which is a block diagram representing integration of the present system 100 to a generic 802.11 Medium Access Control Layer (MAC), Physical Layer (PHY) chipset and radio frequency (RF) transceiver 110. Although it is illustrated as an external block, the present system 100 can be implemented within a PHY/MAC chipset 120. The transceiver 110 comprises several types of components: the PHY/MAC chipset 120, at least one radio subsystem 130 and the present system 100. The radio subsystem 130 typically comprises an analog to digital converter, a digital to analog converter, a receiver/transmitter radio frequency chain, and an antenna. The antenna could consist in one aspect of a ScisWave antenna depicted on FIG. 4 and described later, or in another aspect of any type of reconfigurable direct antenna. The transceiver 110 may comprise several radio subsystems 130, all using the same type of antenna, or different types of antennas.

Figure 4:
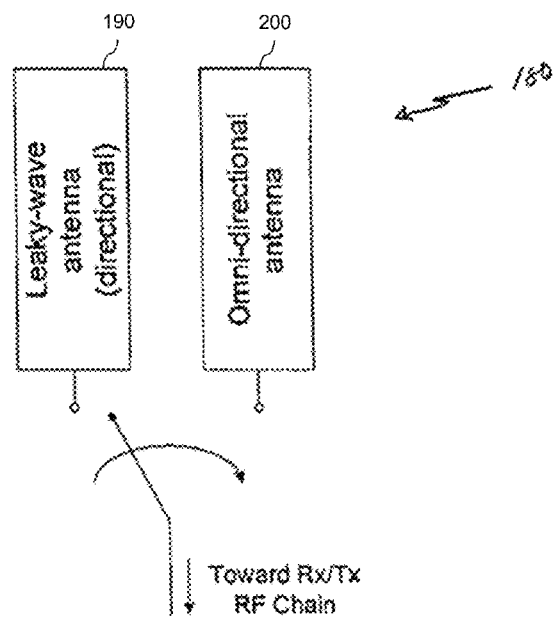
FIG. 4 is a schematic representation of co-located omni directional and directional antennas.

Referring now concurrently to FIGS. 3 and 4, a description of the ScisWave Antenna 180 will be provided. The ScisWave antenna is in fact the co-location of a directional antenna 190 such as a leaky wave antenna, a CRLH leaky wave antenna with an omni directional antenna 200, or a dynamic radiation pattern antenna system such as described in U.S. patent application Ser. No. 11/947,759. In this particular aspect, the omni-directional antenna 200 is used to receive from unknown sources (for example when a station joins the network) a new signal. In this particular aspect, the omni-directional antenna 200 is only used during signal acquisition and sample collection, and thereafter the directional antenna 190 is used and oriented toward the desired target in order to provide a high throughput and reliable data link. Adding an additional omni-directional antenna 200 has a negligible impact on real estate and Bill of Materials ("BOM"). However, the present system is not limited to the use of the ScisWave antenna as described and shown on FIG. 4, and could alternately use other alternatives such as later on described with reference to FIG. 5.

Reverting to FIG. 3, the present system comprises a sample collection unit 140, a power angular spectrum estimation unit 150 and a control unit 160. The system 100 may further comprise a packet detection unit 170. The power angular spectrum estimation unit 150 is adapted for estimating parameters such as angle of arrival, angular spread and power gain.

In wireless communications, the transceiver 110 receives and transmits data from/to an access point (AP) to which it is associated with. The data is exchanged in accordance with a pre-established protocol and format. The present system seamlessly comes into action upon receipt of a new signal, i.e. initiation of a new exchange of data, or when the signal deteriorates below a predetermined threshold. The threshold may be established on one or plural parameters, such as for example signal to noise ratio, signal power, etc.

Figure 5:
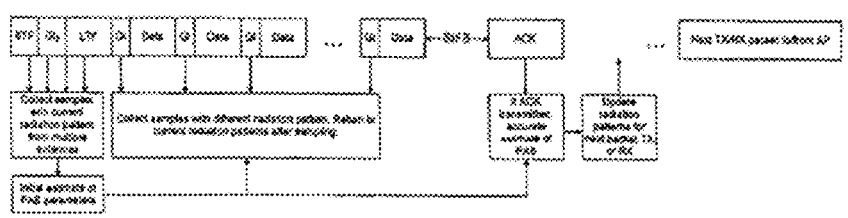
FIG. 5 is a block diagram representing use of the present system in the context of a signal in accordance with a first aspect.

Reference is now made concurrently to FIGS. 3 and 5, where FIG. 5 is a block diagram representing use of the present system for controlling a radiation pattern of a directional antenna for a data signal in accordance with a first aspect. For doing so, the antennas will initially be used in the omni-directional mode and the 802.11 packet detection block will be used to detect an incoming packet and trigger sample collection with the current radiation patterns (in this case the omni-directional pattern) and get an initial estimate of the PAS parameters. More particularly, the sample collection unit 140 collects a plurality of samples of the signal with a current radiation pattern from multiple antennas. The multiple antennas may comprise multiple omnidirectional antennas, multiple directional antennas, or a combination thereof. Then, the power angular spectrum estimation unit 150 estimates a preliminary spectrum based on the collected samples. The sample collection unit 140 further collects samples of the signal with different radiation patterns, each different radiation pattern being applied during a guard interval of the signal. After each guard interval, the radiation pattern returns to an initial radiation pattern. The power angular spectrum estimation 150 estimates an optimized spectrum based on the collected plurality of samples with different radiation patterns. The system 100 then verifies whether an acknowledgement has been transmitted, and if so, the control unit 160 sets the radiation pattern of the directional antenna to the estimated optimized spectrum. The control unit 160 is adapted for actuating successive or concurrent receipt of the signal by means of the multiple antennas, and for switching receipt of the signal from the multiple antennas to the directional antenna. Furthermore, the control unit 160 controls the radiation pattern of the directional antenna, by for example in the case of the CRLH leaky wave antenna, adjusting the reverse bias voltage of the varactor diodes. When the transceiver 110 determines that a new signal is received or that the signal quality deteriorates, the present system 100 repeats the steps of collecting samples, estimating preliminary and optimized spectrums, and setting the radiation pattern of the directional antenna to the estimated optimized spectrum.

In the case where the antennas are DRPD systems, the DRPD algorithms are first disabled and the antennas are operated in the omni-directional mode in order to let the transceiver 110 receive beacons from multiple sources and select the one it wants to associate with. Then, when the association and authentication is completed, the DRPD algorithms are re-enabled.

To enable use of the present system with generic chipsets, it is not possible to modify the radiation patterns of antennas during the Short Training Field (STF) and Guard Interval 2 (GI2) fields without guaranteeing that it will not interfere with the PHY operation, since some of these symbols might be used to perform critical function such as Automatic Gain Control (AGC) and frequency/timing offset estimation. On the other hand, after the Long Training Field (LTF), where channel estimation is performed, it is not possible to change the radiation pattern since it will change the channel and will compromise the correct reception of data (most 802.11 implementations don't perform channel tracking during a packet). Fortunately, the guard interval (GI) in each Orthogonal Frequency Division Modulation (OFDM) symbol of data is not used by the receiver. The present system takes advantage of the GI and uses a novel approach where the radiation pattern is varied only during the GI fields (and return to the radiation patterns used at the packet beginning after each GI field) to collect additional samples and further refined the PAS parameters estimation so to obtain an optimized estimated spectrum.

Verification that the acknowledgement has been transmitted is performed at the end of the packet, by observing if a transmission is done after a Short Interframe Space (SIFS) interval. This indicates an acknowledgement (ACK) transmission and thus that the data was from the AP. In that case, the optimized estimated spectrum is used to set the radiation pattern of the directional antenna. Otherwise, the collected samples are simply discarded and the previous radiation pattern is kept.

If an upper layer of the transceiver 110 decides to select a new AP (for example if the received signal to noise ratio (SNR) gets below a given threshold), the DRPD algorithm can be disabled and the omni-directional antenna are selected to enable reception of beacons from other APs and a new association. Afterward, the DRPD algorithm gets enabled to lock onto this new AP.

An enable/disable signal applied to the DRPD algorithm is associated with events taking place at layers above the MAC layer and can thus be easily generated. Similarly, the transmitting (TX)/receiving (RX) signal required to detect the ACK transmission is a signal used by every 802.11 PHY to enable TX power amplifiers and control the TX/RX RF switch.

Figure 6:
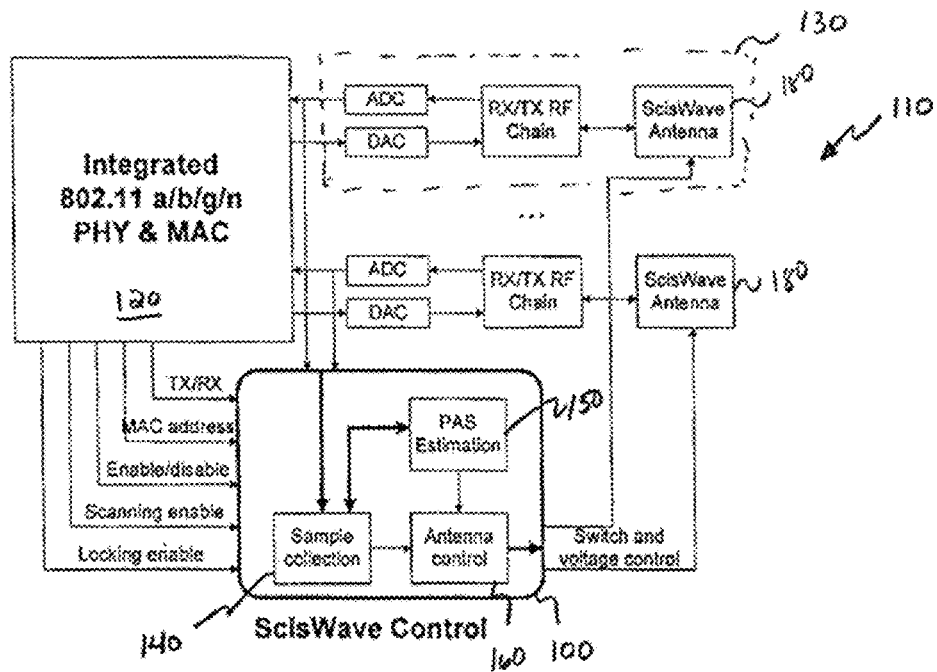
FIG. 6 is a block diagram representation of the present system in accordance with another aspect.

Reference is now made to FIG. 6, which is a block diagram representation of the present system in accordance with another aspect. This other aspect is similar to the system depicted in FIG. 3, with the difference that additional signals indicating to the system 100 when it is safe to change the radiation patterns without disturbing the PHY or MAC layers. This aspect further renders possible removal of the packet detection block in the present system 100.

Figure 7:
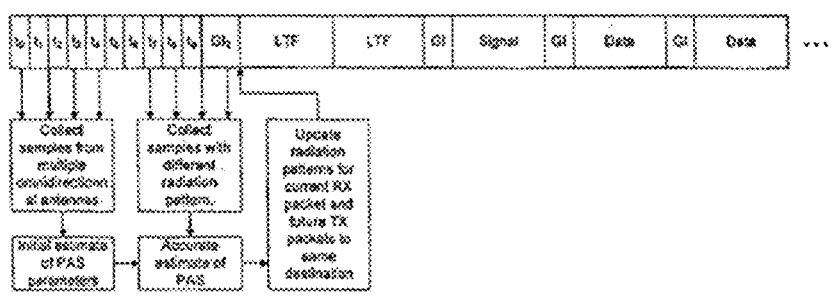
FIG. 7 is a block diagram representing use of the present system in the context of a signal in accordance with another aspect.

Turning now to FIG. 7, depicted is a block diagram representing use of the present system in accordance with another aspect. In this particular aspect, the plurality of samples with current radiation pattern is collected by multiple omni directional antennas and the plurality of samples with different radiation patterns are collected by directional antennas with different radiation patterns. More particularly, the plurality of samples is collected during unused PHY layer symbols such as STF or GI2 fields. By collecting the samples during these preliminary fields, it is possible to fix the radiation pattern before an LTF field, where the PHY layer performs channel estimation.

This aspect of the system enables if desired, or required, an adaptation to short term channel conditions on a packet-per-packet basis. It is also possible to revert to long term adaptation which can be facilitated by the available MAC address. However, long term adaptation may not be possible in reception at the AP, as the incoming MAC address is known only after the entire packet has been received, thus short term adaptation seems more interesting at the AP. However, in transmission at the AP it is possible to use long term adaptation from the information gathered in reception since the channel is symmetric and the destination MAC address is available prior to transmission. At the terminal, since transceiving is performed only with the AP, long term adaptation can be used both in TX and RX, and short term adaptation is also available in RX.

In the present description, the 802.11 standard is used for illustrative purposes only, as the present system 100 may apply to various other wireless standards such as, but not limited to, Worldwide Interoperability for Microwave Access (WiMAX), Universal Mobile Telecommunications System (UMTS), High Speed Packet Access, Long Term Evolution LTE), etc. Indeed the schematic blocks illustrated in grey (sample collection, power angular spectrum (PAS) estimation and antenna control) are common to many standards and only the packet detection unit 170 and the control signals used to trigger sample collection are customized for each standard.

The invention claimed is:

1. A radiation pattern control system for controlling a radiation pattern of a directional Composite Right/Left-Handed Leaky Wave Antenna (CRLH LWA), the system comprising:
   a sample collection unit for collecting a plurality of samples of a signal with a current radiation pattern and a plurality of samples of the signal with different radiation patterns;
   a power angular spectrum estimation unit for estimating a preliminary power angular spectrum of the signal based on the collected plurality of samples with the current radiation pattern and for estimating an optimized power angular spectrum of the signal based on the collected plurality of samples with different radiation patterns; and
   a control unit for setting the radiation pattern of the directional antenna to the estimated optimized power angular spectrum;
   wherein each of the plurality of samples of the signal with the different radiation patterns is obtained during a guard interval of the signal.

2. The radiation pattern control system of claim 1 wherein:
   the plurality of samples of the signal with the current radiation pattern are obtained by means of multiple antennas; and
   the control unit is further adapted for actuating successive receipt of the signal by means of the multiple antennas, and for switching receipt of the signal from the multiple antennas to the directional antenna.

3. The radiation pattern control system of claim 1, wherein:
   the plurality of samples of the signal with the current radiation pattern are obtained by means of multiple antennas; and
   the control unit is further adapted for actuating concurrent receipt of the signal by means of the multiple antennas, and for switching receipt of the signal from the multiple antennas to the directional antenna.

4. The radiation pattern control system of claim 2, wherein the multiple antennas are omni-directional antennas.

5. The radiation pattern control system of claim 2, wherein the multiple antennas are additional directional antennas.

6. The radiation pattern control system of claim 5, further comprising a packet detection unit for detecting a packet in the signal.

7. The radiation pattern control system of claim 5, wherein each of the plurality of samples of the different radiation patterns is obtained by one of the multiple antennas during a guard interval of the signal.

8. The radiation pattern control system of claim 1, wherein the power angular spectrum estimation unit estimates power angular spectrum parameters of the signal consisting of at least one of the following: angle of arrival, angular spread and power gain.

9. The radiation pattern control system of claim 4, wherein each of the omni directional antennas is paired and co-located with a corresponding directional antenna.

10. The radiation pattern control system of claim 1, wherein the signal is an OFDM signal.

11. The radiation pattern control system of claim 1, wherein the sample collection unit, the power angular spectrum estimation unit and the control unit are actuated upon receipt of a new signal.

12. The radiation pattern control system of claim 1, wherein the sample collection unit, the power angular spectrum estimation unit and the control unit are actuated upon detection that the signal deteriorates.

* * * * *